United States Patent [19]

Ebner et al.

[11] Patent Number: 4,549,406
[45] Date of Patent: Oct. 29, 1985

[54] COOLING DEVICE FOR VEHICLE INTERIORS

[76] Inventors: Anneliese Ebner; Erwin Kranauer, both of Rennstallweg 41, 39012 Meran, Italy

[21] Appl. No.: 624,664
[22] PCT Filed: Oct. 28, 1983
[86] PCT No.: PCT/EP83/00282
   § 371 Date: Jun. 19, 1984
   § 102(e) Date: Jun. 19, 1984
[87] PCT Pub. No.: WO84/01749
   PCT Pub. Date: May 10, 1984

[30] Foreign Application Priority Data

Oct. 28, 1982 [IT] Italy ................. 4849 A/82

[51] Int. Cl.[4] .............................................. B60H 3/04
[52] U.S. Cl. ........................... 62/241; 62/259.4; 261/104; 261/DIG. 3
[58] Field of Search .......... 261/104, DIG. 3, DIG. 4; 62/241, 259.4, 304; 206/408

[56] References Cited

U.S. PATENT DOCUMENTS

| | | | |
|---|---|---|---|
| 2,031,055 | 2/1936 | McKinney | 261/104 X |
| 2,151,097 | 3/1939 | Germonprez | 62/241 X |
| 2,552,819 | 5/1951 | Schwarzmayr | 62/241 |
| 2,587,197 | 2/1952 | Mousel | 261/DIG. 4 |
| 2,800,306 | 7/1957 | Freeman | 261/104 X |
| 2,959,032 | 11/1960 | Davis | 261/104 X |
| 3,144,970 | 8/1964 | Beschmann | 206/408 X |
| 3,606,982 | 9/1971 | Anderson | 261/DIG. 4 |

FOREIGN PATENT DOCUMENTS 464415 10/1936 United Kingdom ............. 62/241

Primary Examiner—William E. Tapolcai
Attorney, Agent, or Firm—McGlew and Tuttle

[57] ABSTRACT

The device comprises an elongated container (2) which can be attached to the roof (1) or a wall of a vehicle in close engagement therewith and transversely of a direction of travel. The container carries a supply of evaporation liquid (9), and contains an absorbent mat (7a) which emerges from the container at the rear lower edge thereof. The container (2) and mat (7a) can be mounted detachably on the roof (1) or the wall. The container (2) may have a cover (3) and be profiled in the manner of a spoiler. The mat (7a) is adapted to be withdrawn from the container (2) and fixed in its withdrawn state. To produce an excess pressure in the interior of the container the container (2) may have one or more ventilation openings (3c).

20 Claims, 1 Drawing Figure

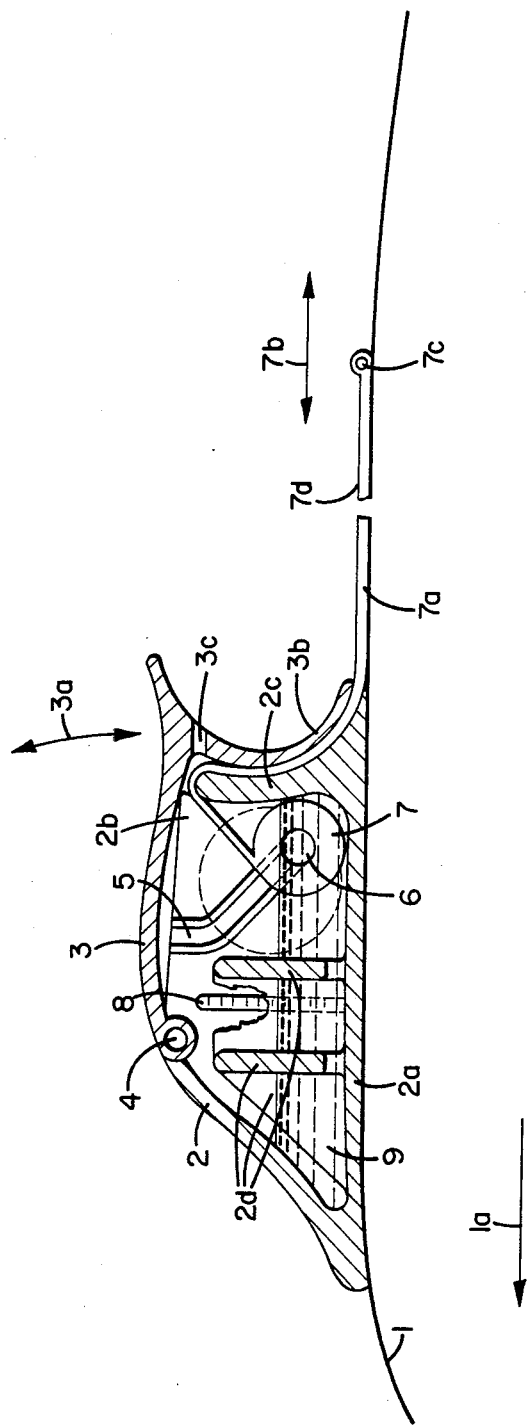

COOLING DEVICE FOR VEHICLE INTERIORS

FIELD AND BACKGROUND OF THE INVENTION

The invention relates to a device for external cooling of vehicle interiors of any type by withdrawal of the heat of evaporation under the action of the relative wind.

The purpose of such a device is under intense sunshine and/or high outer temperature to keep the temperature in the respective vehicle interior within acceptable and pleasant limits.

Cooling devices for vehicles are known which operate in a thermodynamic cyclic process with the aid of compressors or absorbers. They are complicated both technically and as regards their energy consumption and are correspondingly expensive. Furthermore, German Pat. No. 887,010, German specification as laid open to inspection No. 2,528,507 and German utility model Nos. 1,926,094 and 7,623,373 disclose devices for cooling vehicle interiors in which the principle of withdrawing heat by evaporation of a liquid under the action of the relative wind is utilized. In one type of cooling device, cooled air is blown into the vehicle interior and in another type a cooled liquid is conducted through radiators disposed in the vehicle interior. In another third type a mat is used which is placed on the roof or a wall of the vehicle compartment and impregnated with the liquid to be evaporated, inter alia water, from a reservoir. The relative wind moves over said mat in order to withdraw heat from the roof or wall by evaporation. Although in particular the latter construction is simple and requires no power, hitherto it had defects which prevented it from becoming widely used. For instance, the mat must either be relatively thick in order to absorb enough water itself or it must be disposed above the respective large-area reservoir. In both cases the heat passage to the evaporation surface is very restricted, particularly since at the bottom a water-impermeable layer or trough is necessary which is generally of plastic to permit adaptation to the roof or wall form.

SUMMARY OF THE INVENTION

The invention is intended to obviate these defects. Consequently, the invention set forth in the claims solves the problem of providing a device for cooling vehicle interiors which is technically and operatively simple, requires no energy apart from the relative wind and the heat to be withdrawn, requires no replenishment over long journeys, but is nevertheless efficient.

The advantages achieved with the invention are due substantially to the fact that the respective mat with small wall thickness can lie directly snug on the roof or wall of the vehicle cabin, ensuring a good heat transfer with practically no delay, and that the mat can nevertheless be supplied to an adequate extent for long periods of time with the liquid to be evaporated from a reservoir.

The invention will be explained hereinafter with reference to an example of embodiment illustrated in the drawing.

BRIEF DESCRIPTION OF THE DRAWINGS

The single FIGURE of the drawing shows a vertical section through the device, in this case mounted on the roof of a vehicle cabin, in the longitudinal direction of the vehicle.

DESCRIPTION OF THE PREFERRED EMBODIMENT

On the roof 1 of the vehicle travelling in the direction of the arrow 1a, transversely to the travelling direction, a container 2 is mounted, for example in the manner of a ski rack, the bottom 2a of which lies at least at its front and/or rear edge closely on the roof 1. For this purpose, the bottom 2a can be made elastically deformable at least at the respective edge or alternatively and preferably the container 2 as a whole can be made elastically deformable. The purpose of the close engagement is to ensure that the relative wind passes only over the container 2 which by the way has substantially the profile of a so-called spoiler. That is, the top of container 2 smoothly curves up from the roof 1 and to the rear in the travel direction. Container 2 is also elongated in a direction transversely to the travel direction 1a.

The container 2 comprises a cover 3 which extends substantially over its entire length and which is pivotal in the direction of the arrow 3a about a hinge 4. In the interior of the container 2 within a lateral guide 5 there is a coiling mechanism 6 similar to a spring window blind for a roll 7 of a mat 7a of absorbent material, for example a fabric, a knitted fabric, a non-woven fabric or felt or a foam material. If necessary the mat is made flexible in two coordinates at the same time, i.e. stretchable. At at least one end wall, 2b, of the container 2 an inspection glass 8 is provided through which the level of the evaporation liquid 9, inter alia water, stored in the container can be read.

The roll 7 dips into the liquid 9. From it, the mat 7a can be pulled over a forwardly concavely curved rear rib-shaped wall 2c of the container 2 and beneath a lip 3b of the cover 3 along the roof 1 in the direction of the arrow 7b outwardly. At its end the mat 7a comprises a reinforcing bead 7c which can be fastened to the roof 1 and ensures that the mat 7a bears on the roof. If necessary, the mat may also be fastened laterally to the roof possibly via similar reinforcing beads. Corresponding reinforcing means are also known from ski racks of the like. It should be noted that the excess pressure arising behind the container 2 due to the flow delay further promotes the bearing of the mat 7a on the roof 1 and as a result even with greatly curved roofs and high travelling speeds it is ensured that a full-area reliable engagement of the mat is obtained.

The mat 7a sucks liquid 9 from the interior of the container 2 and due to capillary action becomes impregnated therewith up to its end. The adhesion effect of the liquid still further promotes the engagement of the mat 7a on the roof 1. Due to the direct contact of the evaporation liquid with the roof and the small necessary thickness of the mat 7a the heat of evaporation withdrawn by the relative wind from the mat surface is taken practically directly from the roof.

To promote the supply of liquid from the container 2 to the mat 7a the container or as illustrated the cover 3 may have ventilation openings 3c by which the relative wind produces an excess pressure in the container. In addition, in or on the mat 7a passages 7d promoting the liquid distribution may be provided. To dampen the liquid movements produced by centrifugal and inertia forces in the interior of the container, said container 2 may comprise members 2d.

Of course, many modifications are possible of the example of embodiment described and illustrated here. Thus, instead of the hinge 4 a film joint may be used, etc.

We claim:

1. A device for cooling an interior of a vehicle having an exterior wall and adapted for travelling in a travel direction, comprising:
a container (2) which is elongated in a direction transversely to the travel direction and which has a bottom (2a) adapted to closely engage on the exterior wall of the vehicle, said container defining an interior space for containing an evaporateable liquid (9) up to a selected level in said space, said container including a rear rib-like wall (2c) extending upwardly from said bottom and above said selected level; and
a mat (7a) of liquid absorbent material for absorbing evaporateable liquid in said container, said mat having a first portion disposed in said container below said selected level and a second portion (7a) extending over said rear wall and along an outer surface of said rear wall down to a level of said bottom (2a), said mat second portion (7a) adapted to extend along the vehicle wall behind said container (2) in the travel direction whereby evaporateable liquid is provided to said second portion of said mat by capillary action.

2. Device according to claim 1, wherein the mat second portion (7a) is adapted to be withdrawn from a roll (7) disposed in the container (2).

3. A device according to claim 1, wherein said first portion of said mat comprises a roll (7) disposed in said container at least partly below said selected level and a spring winding mechanism (6) for permitting withdrawal and retraction of said mat second portion (7a).

4. Device according to claim 2 or 3, wherein one of the roll (7) and the winding mechanism (6) is mounted for up and down movement in lateral guides (5) of the supply container (2).

5. Device according to claim 1, wherein the supply container (2) has a cover (3) which extends substantially over the entire length of the container in the travel direction and is articulately connected in hinge-like manner.

6. Device according to claim 1, wherein the container (2) is profiled substantially in the manner of an air spoiler.

7. Device according to claim 1, wherein at least at one point at which an excess pressure due to relative wind is to be expected the supply container comprises at least one ventilation opening (3c).

8. Device according to claim 1, wherein the container (2) comprises in its interior members (2d) for damping the movement of the liquid (9).

9. Device according to claim 1, wherein at least the bottom (2a) of the container (2) consists at least at its longitudinal extending edges of resilient material.

10. Device according to claim 1, wherein the mat is simultaneously flexible in two coordinate directions.

11. Device according to claim 1, wherein the mat consists substantially of one of a fabric, a knitted fabric, a nonwoven fabric, a felt and a foam material.

12. Device according to claim 1, wherein the mat comprises passages (7d) promoting the liquid distribution.

13. Device according to claim 1, wherein the mat comprises at a rear free end thereof a reinforcement (7c).

14. Device according to claim 1, wherein the container (2) and the mat (7a) can be clamped or strapped to the vehicle or the wall.

15. A device according to claim 1, wherein said rear wall is curved concavely forwardly, said mat second portion lying against an outer concave surface of said rear wall, said container including a backwardly sloped and upwardly curved front wall in said travel direction and a cover (3) pivotally mounted to said front wall and having an outer smoothly curved surface so that an outer contour of said container forms an air spoiler, said cover having a rearwardly extending fin portion and a downwardly extending lip (3b) overlying a part of said mat second portion (7a).

16. A device according to claim 15, wherein said lip includes at least one ventilating opening (3c).

17. A device according to claim 16, wherein said mat first portion comprises a roll of absorbent material and a spring loaded rolling mechanism (6) for mounting said roll for withdrawal and retraction of said mat second portion (7a).

18. A device according to claim 17, including at least one interior wall (2d) in said container space for dampening movement of evaporateable liquid (9) in said space.

19. A device according to claim 18, including guide means (5) in said space and engaged with said winding mechanism (6) for permitting vertical displacement of said roll to regulate an amount of said roll disposed below said selected level and thus in said evaporateable liquid.

20. A device according to claim 19, including a reinforcing element (7c) at a rear edge of said mat second portion (7a).

* * * * *